(12) United States Patent
Huff et al.

(10) Patent No.: US 11,485,334 B2
(45) Date of Patent: Nov. 1, 2022

(54) SUPPLEMENTAL DECELERATION USING ELECTRONIC PARKING BRAKE IN FULLY INTEGRATED BRAKING SYSTEMS

(71) Applicant: Robert Bosch GmbH, Stuttgart (DE)

(72) Inventors: E. Michael Huff, Plymouth, MI (US); Ryan A. Kuhlman, Pinckney, MI (US); Christian Meister, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 16/616,226

(22) PCT Filed: May 24, 2018

(86) PCT No.: PCT/EP2018/063727
§ 371 (c)(1),
(2) Date: Nov. 22, 2019

(87) PCT Pub. No.: WO2018/219789
PCT Pub. Date: Dec. 6, 2018

(65) Prior Publication Data
US 2020/0094801 A1 Mar. 26, 2020

Related U.S. Application Data

(60) Provisional application No. 62/513,225, filed on May 31, 2017.

(51) Int. Cl.
*B60T 8/88* (2006.01)
*B60T 8/172* (2006.01)
(Continued)

(52) U.S. Cl.
CPC .............. *B60T 8/885* (2013.01); *B60T 8/172* (2013.01); *B60T 8/1761* (2013.01); *B60T 17/22* (2013.01);
(Continued)

(58) Field of Classification Search
CPC ...................................................... B60T 8/885
See application file for complete search history.

(56) References Cited

U.S. PATENT DOCUMENTS 8,532,902 B2  9/2013  Bentner et al.
9,145,114 B2  9/2015  Bajorat
(Continued)

FOREIGN PATENT DOCUMENTS

DE  102011110892 A1  2/2013
DE  102013208671 A1  11/2014
(Continued)

OTHER PUBLICATIONS

Translation of Japanese Patent Office Notice of Reasons for Refusal for Patent Application No. 2019-566129 dated Oct. 26, 2020 (4 pages).
(Continued)

Primary Examiner — Imran K Mustafa
(74) Attorney, Agent, or Firm — Michael Best & Friedrich LLP

(57) ABSTRACT

A method and system for braking a vehicle using supplemental deceleration provided by an electronic parking brake. The method includes detecting a reduced function state of an integrated braking system; detecting a brake pedal input from an operator of the vehicle; and automatically generating a braking force via the electronic parking brake based on the brake pedal input and the reduced function state.

18 Claims, 3 Drawing Sheets

(51) Int. Cl.
*B60T 8/1761* (2006.01)
*B60T 17/22* (2006.01)

(52) U.S. Cl.
CPC ..... *B60T 2220/04* (2013.01); *B60T 2270/402* (2013.01)

(56) References Cited

U.S. PATENT DOCUMENTS

| | | |
|---|---|---|
| 9,421,958 B2 | 8/2016 | Dix et al. |
| 2004/0135432 A1* | 7/2004 | Reuter .................. B60T 8/4081 303/152 |
| 2005/0029864 A1 | 2/2005 | Bauer et al. |
| 2012/0179345 A1* | 7/2012 | Vollert .................... B60T 13/74 701/70 |
| 2015/0266457 A1* | 9/2015 | Johnson .................. B60T 7/042 303/15 |
| 2016/0090071 A1* | 3/2016 | Tuhro .................... B60T 17/22 701/70 |
| 2016/0264113 A1 | 9/2016 | Feigel |

FOREIGN PATENT DOCUMENTS

| | | |
|---|---|---|
| EP | 2108554 A1 | 10/2009 |
| GB | 2349675 A | 11/2000 |
| WO | 2006010735 A1 | 2/2006 |

OTHER PUBLICATIONS

International Search Report and Written Opinion dated Aug. 24, 2018, International Appl. No. PCT/EP2018/063727.

\* cited by examiner

SUPPLEMENTAL DECELERATION USING ELECTRONIC PARKING BRAKE IN FULLY INTEGRATED BRAKING SYSTEMS

The present application claims priority to U.S. Provisional Application No. 62/513,225, filed May 31, 2017, the entire content of which is hereby incorporated by reference.

BACKGROUND

Some modern vehicles include integrated braking systems. Integrated braking systems combine several brake system components into a single modular unit. The integrated braking system offers some advantages over traditional component-based systems. These advantages may include centralized braking control with electronic stability control and antilock braking performed in a single unit and by a single integrated brake controller.

In these systems, a parking brake and parking brake controller are often separate component parts that function independently of the integrated braking system. The parking brake may be implemented using motor-on-caliper (MoC) technology controlled by a software routine embedded within a separate electronic control unit. The parking brake hardware and software is commonly supplied by a third party manufacturer and is not integrated within the integrated braking system.

SUMMARY

Embodiments relate to recognizing the status of the braking system (for example, degraded functionality, loss of control unit power, brake component failure, and others) by an integrated brake controller and triggering the electronic parking brake based on normal driving actions (for example, brake pedal input) when the functionality of the primary brakes is compromised. To achieve this, the electronic parking brake may be activated by the integrated brake controller and operated according to brake pedal travel.

Embodiments provide benefits to an operator of the vehicle by, among other things, reducing brake pedal travel during abnormal states of the integrated braking system. Currently, brake pedal travel experienced by the operator in backup modes is longer than during normal operation. This discrepancy in "brake feel" may concern the operator. This discrepancy in "brake feel" and in brake pedal travel in backup modes is due to the mechanical ratios inherent in integrated brake systems. Some embodiments partially mitigate this effect by performing brake valve control using the integrated brake controller while in the backup mode.

Embodiments provide a braking system and a method of decelerating a vehicle equipped with an integrated braking system. The method includes decelerating the vehicle using primary brakes and monitoring the braking system for malfunctions. When a malfunction occurs, an electronic brake controller detects the malfunction, determines a magnitude of a secondary braking force needed to decelerate, and sends a request to an electronic parking brake controller to activate a parking brake based on the magnitude of the secondary braking force.

In particular, one embodiment provides a method of decelerating a vehicle equipped with the integrated braking system. The method includes detecting, with an electronic controller, a reduced function state of the integrated braking system; detecting, with the electronic controller, a brake pedal input from an operator of the vehicle; and automatically, by the electronic controller, generating a supplemental braking force via an electronic parking brake based on the brake pedal input and the reduced function state.

Another embodiment provides a system of decelerating a vehicle equipped with the integrated braking system. The system includes a brake pedal; an integrated braking system; an electronic parking brake; and an electronic controller configured to detect a reduced function state of an integrated braking system. The electronic controller is also configured to detect, from the brake pedal, a brake pedal input from an operator of the vehicle; and automatically generate a supplemental braking force via the electronic parking brake based on the brake pedal input and the reduced function state.

Other aspects, features, and embodiments will become apparent by consideration of the detailed description and accompanying drawings.

DETAILED DESCRIPTION

Before any embodiments are explained in detail, it is to be understood that embodiments described herein are not intended to be limited in their application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs) and other circuits, and various connections (for example, a system bus) connecting the various components.

Figure 1:
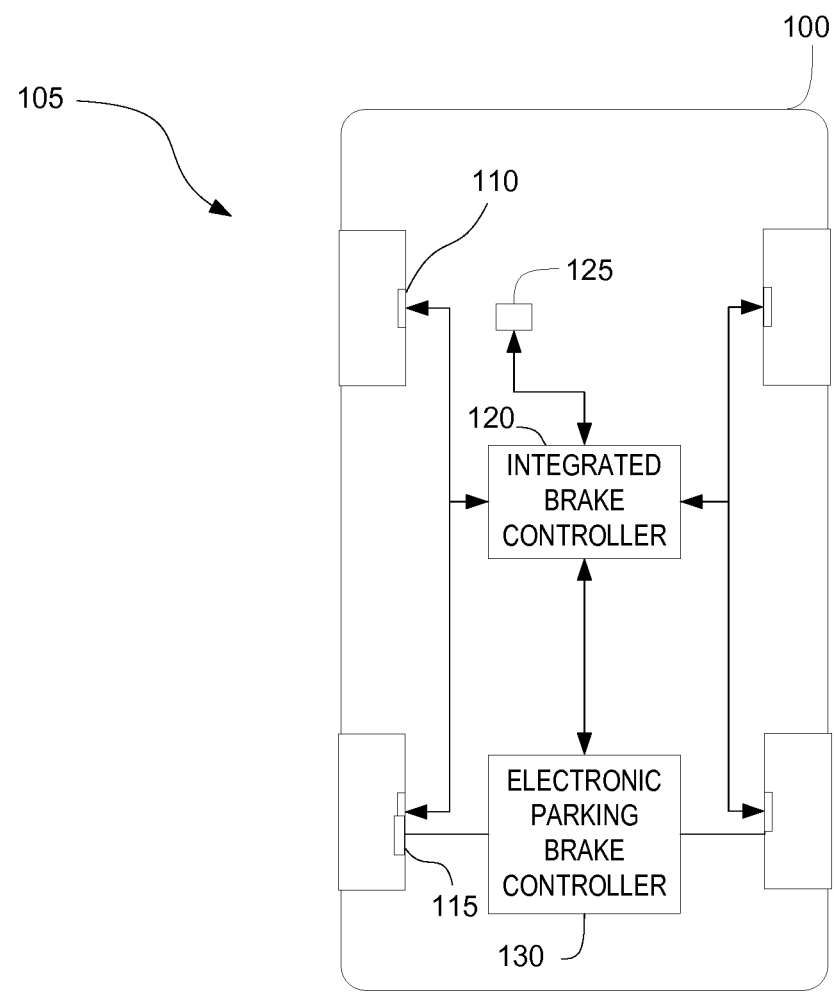
FIG. 1 is a block diagram of a vehicle equipped with a braking system according to one embodiment.

FIG. 1 illustrates a vehicle 100 equipped with a braking system 105 according to one example. The braking system 105 is configured to decelerate the vehicle 100 even when primary brakes of the braking system 105 fail. The vehicle 100, although illustrated as a four-wheeled vehicle, encompasses various types and designs. For example, the vehicle 100 may be an automobile, a truck, a bus, a semi-tractor, and others. In the example illustrated, braking system 105 includes primary brakes 110 (for example, disc brakes on one or more wheels of the vehicle 100), a parking brake 115, an integrated brake controller 120, a brake pedal 125, and an electronic parking brake controller 130. In some embodiments, the braking system 105 includes sensors (for example, brake pressure sensors, brake position sensors, and others) that are communicatively connected to the integrated brake controller 120. These components are described in more detail below.

The components of the braking system 105 may be communicatively connected via various types of electronic, mechanical, or hydraulic connections. For example, in one embodiment, the brake pedal 125 is communicatively coupled to the integrated brake controller 120 via a wired connection (for example, brake-by-wire technology). In another example, the integrated brake controller 120 is connected to the electronic parking brake controller 130 via a direct wired connection or wired via a communication bus. In some embodiments, the integrated brake controller 120 and the electronic parking brake controller 130 are separate and independent control units that are manufactured and supplied by independent manufacturers. In these cases, the integrated brake controller 120 and the electronic parking brake controller 130 are configured to communicate via predetermined protocols. The electronic parking brake controller 130 is configured to activate the parking brake 115 based on a signal from the integrated brake controller 120.

The integrated brake controller 120 includes various components of the braking system 105 and is configured to provide braking control for the vehicle 100. In one embodiment, particular components of braking system 105 are combined within the integrated brake controller 120 to form a single modular unit. For example, integrated components may include an electric pump, an accumulator, a hydraulic modulator, a master cylinder, and others. In these embodiments, the integrated brake controller 120 may perform many of the functions of the braking system 105 including, for example, determining a desired magnitude of braking power, generating hydraulic pressure for braking based on the desired magnitude, and distributing the hydraulic pressure to one or more primary brakes 110.

The integrated brake controller 120 is configured to receive information from other vehicle systems, sensors, and electronic control units regarding the behavior of the vehicle 100. In particular, the integrated brake controller 120 is also configured to receive wheel speed data from one or more wheel speed sensors (not shown). The integrated brake controller 120 performs antilock braking and electronic stability control for the vehicle 100 based at least in part on the wheel speed data.

The integrated brake controller 120 is configured to receive information indicative of a brake request. The integrated brake controller 120 is configured to receive a signal from the brake pedal 125 (for example, a brake pedal position sensor) indicative of an amount of braking power desired by the operator. In some embodiments, the integrated brake controller 120 receives a braking request from semi-autonomous vehicle systems. The integrated brake controller 120 is configured to control the primary brakes 110 based on the brake request.

The integrated brake controller 120 also is configured to perform diagnostics for the braking system 105. In particular, the integrated brake controller 120 is configured to run diagnostics that identify malfunctions within the braking system 105 and malfunctions of specific components within the braking system 105. In some instances, the integrated brake controller 120 identifies hydraulic fluid leaks, vacuum leaks, pump failure, loss of primary brake boost, and others.

Figure 2:
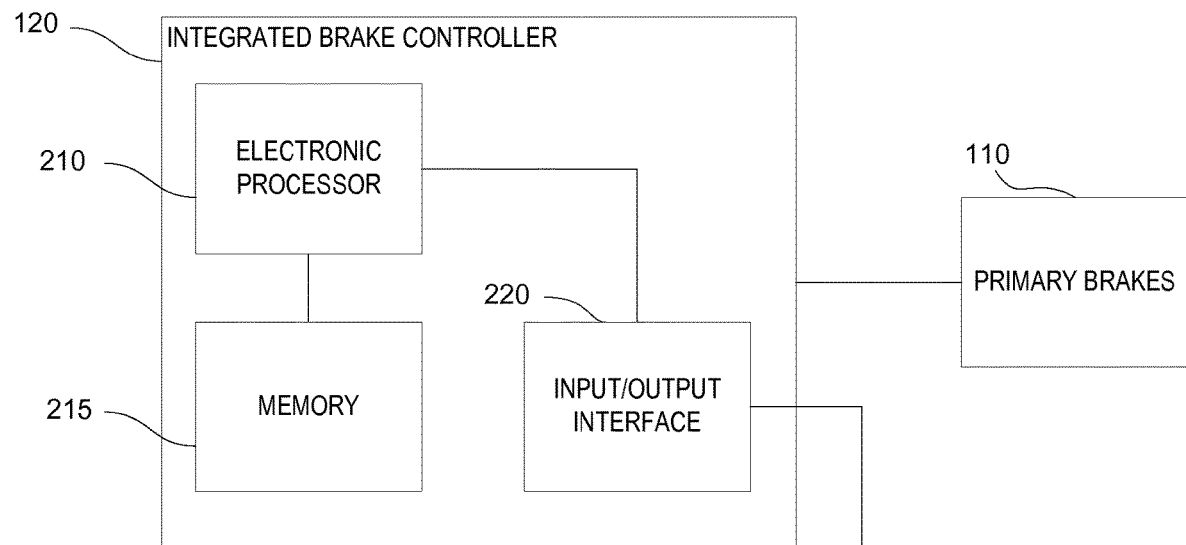
FIG. 2 is a block diagram of an integrated brake controller of the system of FIG. 1 according to one embodiment.

FIG. 2 is a block diagram of the integrated brake controller 120 according to one example. The integrated brake controller 120 includes a plurality of electrical and electronic components that provide power, operational control, and protection to the components and modules within the braking system 105. The integrated brake controller 120 includes, among other things, an electronic processor 210 (such as a programmable electronic microprocessor, microcontroller, or similar device), a memory 215 (for example, non-transitory, machine readable memory), and an input/output interface 220. In some embodiments, the integrated brake controller 120 includes additional, fewer, or different components. For example, the integrated brake controller 120 may be implemented in several independent electronic control units or modules each configured to perform specific steps or functions of the integrated brake controller 120.

The electronic processor 210, in coordination with the memory 215, the input/output interface 220, and other components of the integrated brake controller 120, is configured to perform the processes and methods discussed herein. For example, the electronic processor 210 is configured to retrieve from memory 215 and execute, among other things, instructions related to determining a braking force for the vehicle 100 (by controlling hydraulic pressure to the primary brakes 110). The input/output interface 220 may include one or more input and output modules for communicating with the other components of the braking system 105 as well as other components of the vehicle 100. For example, the input/output interface 220 is configured to communicate with the electronic parking brake controller 130.

Figure 3:
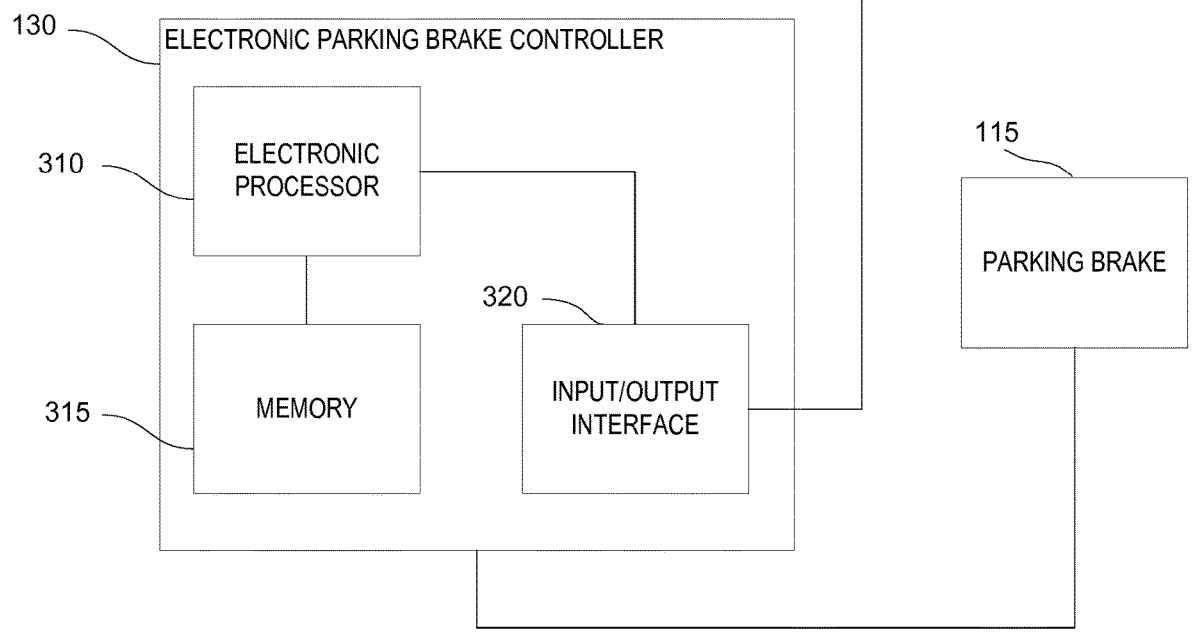
FIG. 3 is a block diagram of an electronic parking brake controller of the system of FIG. 1 according to one embodiment.

FIG. 3 is a block diagram of the electronic parking brake controller 130 according to one embodiment. In the illustrated example, the electronic parking brake controller 130 includes, among other things, an electronic processor 310 (such as a programmable electronic microprocessor, microcontroller, or similar device), a memory 315 (for example, non-transitory, machine readable memory), and an input/output interface 320. In some embodiments, the electronic parking brake controller 130 includes additional, fewer, or different components.

In operation, the electronic parking brake controller 130 activates the parking brake 115 based on one or more brake requests. The brake requests may be manual or automatic. When applied manually, the electronic parking brake controller 130 receives a signal indicative of an operator selected request via a parking brake switch. Once the parking brake switch is activated, the electronic parking brake controller 130 activates the parking brake 115 regardless of the status of the signal from the electronic parking brake controller 130. When applied automatically, the electronic parking brake controller 130 receives a brake request from the integrated brake controller 120. The automatic brake request may indicate an amount of braking force to be applied to the parking brake. The automatic brake request may designate an amount of braking force as determined by the electronic parking brake controller 130. The amount of braking force may be modulated or otherwise adjusted via a pulsed brake request from the integrated brake controller 120.

Figure 4:
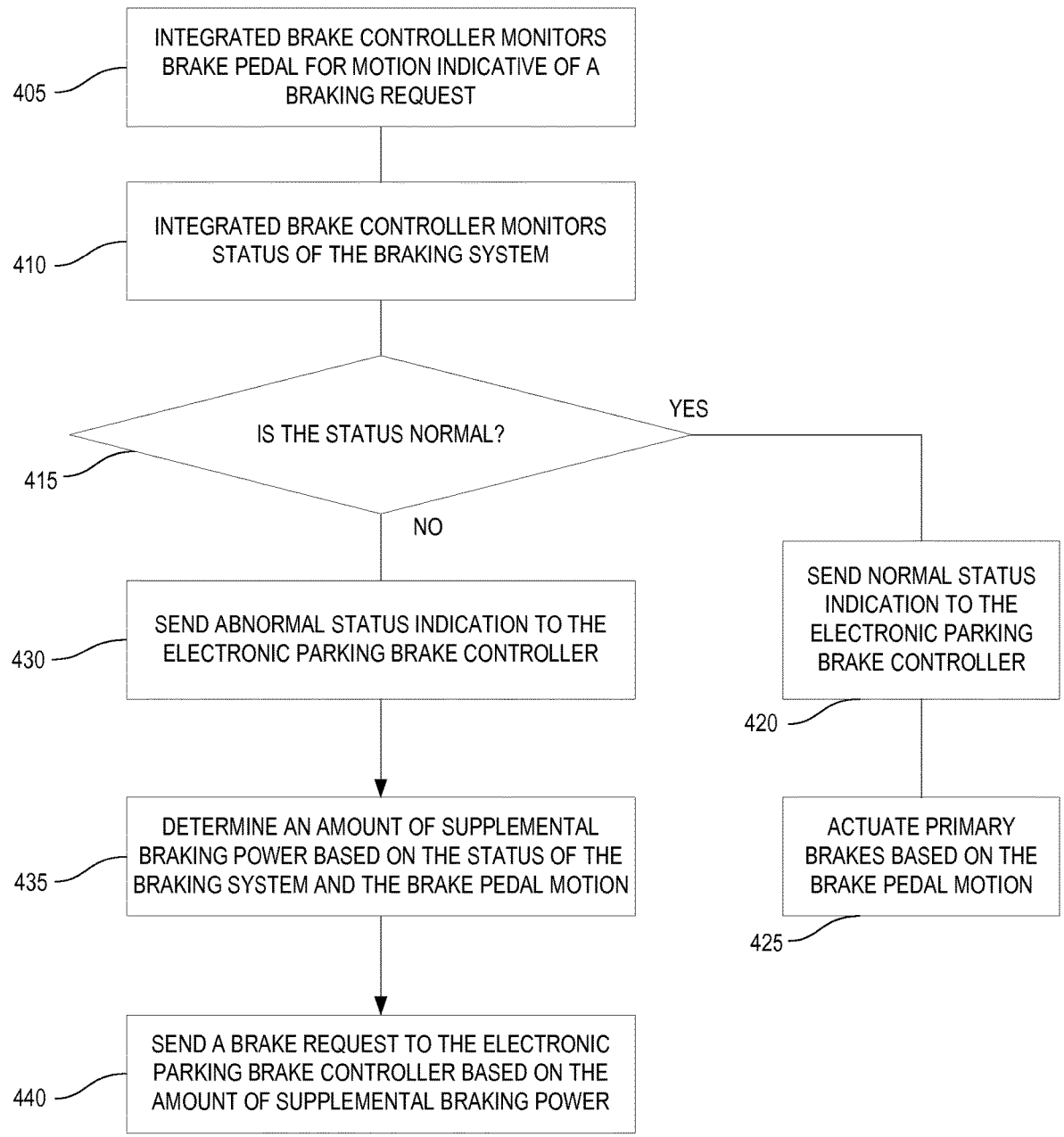
FIG. 4 is a flowchart of a method of operating the braking system of FIG. 1 according to one embodiment.

FIG. 4 is a flowchart of a method of braking the vehicle 100 equipped with the braking system 105 according to one embodiment. In the example provided, the method includes monitoring the brake pedal 125 for motion indicative of a brake request by an operator of the vehicle 100 (block 405). The integrated brake controller 120 monitors a status of the braking system 105 (block 410). As discussed above, monitoring the status may include determining if any malfunctions are occurring in the braking system 105 including hydraulic fluid leaks, vacuum leaks, pump failure, valve failure, sensor failure, and others. The integrated brake controller 120 determines if the status of the braking system 105 is normal (for example, operating without any detected malfunctions) (block 415). When the status of the braking system 105 is normal, the integrated brake controller sends a signal to the electronic parking brake indicating that the status is normal (block 420). In this instance, the electronic parking brake controller 130 does not activate the parking brake 115 unless the manual parking brake switch is activated by the operator. When the status of the braking system 105 is normal, the integrated brake controller 120 actuates the primary brakes 110 based on the brake pedal motion (block 425).

When the status of the braking system 105 is not normal (for example, when malfunctions are detected within the braking system 105), the integrated brake controller 120 activates a "back up" mode and sends an abnormal status indication to the parking brake 115 (block 430). In some instances, the abnormal status indication is simply a request to apply the parking brake. The integrated brake controller 120 determines an amount of supplemental (for example, secondary) braking power based on the status of the braking system 105 and the motion of the brake pedal 125 (block 435).

For example, when a malfunction results in a loss in braking power, the integrated brake controller 120 identifies the malfunction as an abnormal braking status. For example, a component in the braking system 105 may fail, causing a malfunction that results in the loss in braking power and creating an abnormal braking status. In some embodiments, the integrated brake controller 120 references a look up table or other preprogrammed data to determine an amount of loss of braking power for each particular malfunction. In some embodiments, the integrated brake controller 120 determines an amount of braking power requested by the operator via the position sensor on the brake pedal 125 and determines whether the primary brakes 110 have the capability to deliver the amount of braking power requested by the operator. When the amount of braking power from the primary brakes 110 is insufficient to deliver the amount of braking power request by the operator, the integrated brake controller 120 determines an amount of supplemental braking power based on the amount of braking power requested by the operator and the capability of the braking system 105. In some embodiments, this includes determining a maximum braking power capability while a particular malfunction is occurring, and subtracting the maximum braking power capability from the braking power requested by the operator to generate a value of the supplemental braking power.

The integrated brake controller 120 then sends a brake request to the electronic parking brake controller 130 based on the amount of supplemental braking power desired (block 440). The brake request triggers the electronic parking brake controller 130 to activate the parking brake 115 based on the brake request. In some embodiments, the brake request specifies a magnitude of braking power to be delivered via the parking brake 115. For example, the brake request may indicate a magnitude of braking force desired. Alternatively, the brake request indicates or includes a modulation to apply and release the parking brake 115 in timed intervals.

In some embodiments, the integrated brake controller 120 continuously monitors the wheel speed sensors for wheel slip while sending the signal to apply the parking brake 115.

In these embodiments, the integrated brake controller 120 adjusts the application of the parking brake 115 to reduce wheel slip. This action results in smoother deceleration than known methods.

In some embodiments, when abnormal brake status occurs, rear wheel isolation valves (not illustrated) are utilized to prevent driver-initiated hydraulic braking pressure from entering rear wheel brakes. Instead, the integrated brake controller 120 controls braking of the rear wheels with only the parking brake 115 while the hydraulic pressure is diverted to the front wheels. Braking of the front wheels is thereby directed controlled by the operator (i.e., based on brake pedal movement). This separation of direct control by the operator of the rear wheels has the benefit of reducing pedal travel of the brake pedal 125 during abnormal brake status. In this instance, deceleration of the vehicle 100 remains relatively the same over the normal range of movement of the brake pedal 125, since the parking brake 115 is activated electronically based on the operator's input to the brake pedal 125. This supplemental braking provides braking torque to the rear wheels while reducing brake pedal travel.

Various features, advantages, and embodiments are set forth in the following claims.

What is claimed is:

1. A method of braking a vehicle using supplemental deceleration provided by an electronic parking brake, the method comprising:
    detecting, via an electronic controller, a reduced function state of an integrated braking system;
    detecting, via the electronic controller, a brake pedal input from an operator of the vehicle;
    automatically, via the electronic controller, generating a supplemental braking force via the electronic parking brake based on the brake pedal input and the reduced function state;
    determining, via the electronic controller, the supplemental braking force, wherein the supplemental braking force is determined based upon the brake pedal input and the reduced function state;
    determining, via the electronic controller, a maximum braking power capability while a particular malfunction is occurring, wherein the electronic controller references programmed data to determine an amount of loss of braking power for each particular malfunction;
    determining, via the electronic controller, a braking power requested by the operator based upon the brake pedal input, and
    subtracting, via the electronic controller, the maximum braking power capability from the braking power requested by the operator to generate a value of the supplemental braking force.

2. The method according to claim 1, wherein the reduced function state of the integrated braking system includes a loss of primary brake boost.

3. The method according to claim 1, further comprising detecting, via the electronic controller, an abnormal brake status.

4. The method according to claim 3, further comprising generating, via the electronic controller, a signal to apply rear wheel isolation valves when the abnormal brake status is detected.

5. The method according to claim 1, further comprising receiving, via the electronic controller, a signal from a wheel slip sensor.

6. The method according to claim 5, wherein automatically generating the supplemental braking force via the electronic parking brake is further based on the received signal from the wheel slip sensor.

7. The method according to claim 1, wherein the automatically generating the supplemental braking force includes sending a brake request from the electronic controller to a parking brake electronic controller.

8. The method of claim 7, wherein the braking request includes a magnitude of supplemental braking force desired.

9. The method of claim 7, wherein the braking request includes a modulation to apply and release the electronic parking brake in timed intervals.

10. A system for braking a vehicle using supplemental deceleration provided by an electronic parking brake, the system comprising:
 a brake pedal;
 an integrated braking system;
 an electronic parking brake; and
 an electronic controller configured to
  detect a reduced function state of an integrated braking system;
  detect, from the brake pedal, a brake pedal input from an operator of the vehicle;
  automatically generate a supplemental braking force via the electronic parking brake based on the brake pedal input and the reduced function state;
  determine the supplemental braking force, wherein the supplemental braking force is determined based upon the brake pedal input and the reduced function state;
  determine a maximum braking power capability while a particular malfunction is occurring, wherein the electronic controller references preprogrammed data to determine an amount of loss of braking power for each particular malfunction;
  determine a braking power requested by the operator based upon the brake pedal input; and
  subtract the maximum braking power capability from the braking power requested by the operator to generate a value of the supplemental braking force.

11. The system according to claim 10, wherein the reduced function state of the integrated braking system includes a loss of primary brake boost.

12. The system according to claim 10, the electronic controller further configured to detect an abnormal brake status.

13. The system according to claim 12, the electronic controller further configured to generate a signal to apply rear wheel isolation valves when the abnormal brake status is detected.

14. The system according to claim 10, the electronic controller further configured to receive a signal from a wheel slip sensor.

15. The system according to claim 14, wherein automatically generating the supplemental braking force via the electronic parking brake is further based on the received signal from the wheel slip sensor.

16. The system according to claim 10, wherein automatically generating the supplemental braking force includes sending a brake request from the electronic controller to a parking brake electronic controller.

17. The system of claim 16, wherein the braking request includes a magnitude of supplemental braking force desired.

18. The system of claim 16, wherein the braking request includes a modulation to apply and release the electronic parking brake in timed intervals.

\* \* \* \* \*